(12) United States Patent
Girondi (10) Patent No.: US 11,638,888 B2
(45) Date of Patent: *May 2, 2023

(54) FILTER CARTRIDGE WITH ENGAGEMENT MEMBERS

(71) Applicant: UFI FILTERS S.P.A., Mantova (IT)

(72) Inventor: Giorgio Girondi, Mantova (IT)

(73) Assignee: UFI FILTERS S.P.A., Mantova (IT)

(*) Notice: Subject to any disclaimer, the term of this patent is extended or adjusted under 35 U.S.C. 154(b) by 128 days.

This patent is subject to a terminal disclaimer.

(21) Appl. No.: 16/969,373

(22) PCT Filed: Feb. 12, 2019

(86) PCT No.: PCT/IB2019/051104
§ 371 (c)(1),
(2) Date: Aug. 12, 2020

(87) PCT Pub. No.: WO2019/159057
PCT Pub. Date: Aug. 22, 2019

(65) Prior Publication Data
US 2020/0398195 A1    Dec. 24, 2020

(30) Foreign Application Priority Data
Feb. 13, 2018    (IT) .................. 102018000002638

(51) Int. Cl.
*B01D 29/21*    (2006.01)
*B01D 29/96*    (2006.01)
*B01D 35/30*    (2006.01)

(52) U.S. Cl.
CPC ............ *B01D 29/21* (2013.01); *B01D 29/96* (2013.01); *B01D 35/30* (2013.01); *B01D 2201/296* (2013.01); *B01D 2201/302* (2013.01)

(58) Field of Classification Search
CPC ........ B01D 29/21; B01D 29/96; B01D 35/30; B01D 2201/296; B01D 2201/302;
(Continued)

(56) References Cited

U.S. PATENT DOCUMENTS

| 2015/0343345 A1* | 12/2015 | Ryoo ................... B01D 36/005 |
| | | 210/86 |
| 2016/0375382 A1* | 12/2016 | Girondi .............. B01D 46/2414 |
| | | 210/232 |
| 2017/0252682 A1 | 9/2017 | Gustafson et al. |

FOREIGN PATENT DOCUMENTS

WO    2015/092523 A1    6/2015

OTHER PUBLICATIONS

International Search Report and Written Opinion of the International Searching Authority for International Patent Application No. PCT/IB2019/051104 dated Apr. 18, 2019, 9 pages.
(Continued)

*Primary Examiner* — Madeline Gonzalez
(74) *Attorney, Agent, or Firm* — Merchant & Gould P.C.

(57) ABSTRACT

A filter cartridge of a filter group of a fluid of a vehicle extends along a main axis including a base assembly and engagement members including first engagement members in the filter cartridge and second engagement members in the base assembly, respectively specially shaped to engage each other in a blocking configuration. The filter cartridge extends along a cartridge axis and includes at an axial end an engagement plane on which the first engagement members are made including at least two tooth elements diametrically opposite the cartridge axis. Each tooth element extends in height from the engagement plane extending on an imaginary surface parallel to the cartridge axis, having a substantially T shape. Each tooth element is elastically yielding in a radial direction, so that the blocking configuration is
(Continued)

achievable following the radial movement of the tooth element.

24 Claims, 8 Drawing Sheets

(58) Field of Classification Search
CPC ........ B01D 2201/291; B01D 2201/305; B01D 2201/4046; B01D 2201/4076; B01D 35/306
USPC .................. 210/232, 442, 444, 455, 175
See application file for complete search history.

(56) References Cited

OTHER PUBLICATIONS

Italian Search Report for Italian Patent Application No. 2018000002638 dated Oct. 1, 2018, 8 pages.

* cited by examiner

FILTER CARTRIDGE WITH ENGAGEMENT MEMBERS

This application is a National Stage Application of PCT/M2019/051104, filed 12 Feb. 2019, which claims benefit of patent application Ser. No. 10/201,8000002638, filed 13 Feb. 2018 in Italy and which applications are incorporated herein by reference. To the extent appropriate, a claim of priority is made to each of the above-disclosed applications.

FIELD OF APPLICATION

The present invention relates to a filter cartridge of a filter group of a fluid. Moreover, the present invention also relates to a base assembly comprised in said filter group of a fluid suitable for engaging said filter cartridge. In addition, the present invention also relates to the filter group of a fluid, the assembling method and disassembling method thereof.

The present invention finds its preferred application in the automotive sector. Specifically, in fact, the context in which the present invention lies is that of filtration systems of a fluid with particular reference to fluids, liquids or gases needed for the operation of a motor vehicle. In other words, the filter group of a fluid and the components that comprise it as per the present invention find their application in the air circuits, oil circuits, fuel circuits and/or in the water (or aqueous solutions) circuits included in a vehicle.

Systems for the filtration of a fluid in automotive applications are known in the prior art.

Such known filtration systems comprise one (or more) filter cartridges integrally connected to a base assembly fluidically connected to the respective fluid circulation system. Depending on the specific application of the filter cartridge, the filter group and the base assembly have different geometries and physical characteristics.

However, in any embodiment of the filter group comprising a filter cartridge said filter cartridge needs to be replaceable according to the needs of the motor vehicle, for example to be replaceable in the case of necessary maintenance.

The main problem of the known filtration systems is therefore that of making the engagement and disengagement operations of the filter cartridge and base assembly simple and intuitive. Along with this need, at the same time a blocking configuration is required in which the filter cartridge and base assembly are reciprocally joined, this blocking being guaranteed over time not presenting the risk of unwanted detachment of the same.

In the prior art, solutions of filtration systems are known which provide for a mutual engagement between the filter cartridge and base assembly requiring complex engagement and/or disengagement operations, in some cases also requiring additional, dedicated components, e.g. safety plugs.

Solution According to the Invention

The purpose of the present invention is therefore to specifically provide a filter group of a fluid that ensures the safe blocking of the filter cartridge to its respective base assembly, but which also allows simple and intuitive engagement and disengagement operations.

DESCRIPTION OF THE DRAWINGS

Further characteristics and advantages of the invention will, in any case, be evident from the description given below of its preferred embodiments, made by way of a non-limiting example with reference to the appended drawings, wherein:

FIGS. 3a' and 3b' are a cross-section view and a view from below of FIGS. 3a and 3b;

FIGS. 4', 4a' and 4b' show the same assembly phases shown in FIGS. 4, 4a and 4b according to an additional longitudinal cross-section plane.

DETAILED DESCRIPTION

In the appended drawings, reference numeral 1 globally denotes a filter group of a fluid. According to the drawings and with the present invention, reference numeral 10 denotes a filter cartridge, while a base assembly is indicated by reference numeral 100.

As shown by way of example in the appended drawings, the filter group of a fluid 1 extends mainly in a main axial direction, in particular along a main axis X-X.

According to the present invention, the filter group of a fluid 1 comprises the filter cartridge 10 (hereinafter extensively described) and the base assembly 100 (in turn, extensively described). Preferably, the two components are thus arranged consecutively along said main axis X-X.

According to the present invention the filter group of a fluid 1 also includes special engagement means 2 suitable for engaging and disengaging the filter cartridge 10 and the base assembly 100 along said main axis X-X.

In particular, said means of engagement comprise first engagement members 20, or cartridge engagement members, comprised in the filter cartridge 10 and second engagement members 200, or base engagement members, comprised in the base assembly 100.

As described below and shown in the appended drawings, the first engagement members 20 and the second engagement members 200 are respectively specially configured to engage each other in a blocking configuration in which the filter cartridge 10 and the base assembly 100 are mutually axially blocked.

In particular, the first engagement members 20 and the second engagement members 200 are specially designed in such a way that in the blocking configuration the first are housed in the second. In particular, in the blocking configuration, the first engagement members 20 and the second engagement members 200 are complementary to each other in such a way as to block the two components in the axial direction.

FIGS. 1a, 1b, 1c, and 1d show schematic diagrams of filtration systems of a fluid 1 according to the present invention, downstream and/or upstream of which the relative supply ducts of the respective filter group which the fluid circulation system which it is suitable to be part of are located on. In particular, these diagrams are suitable for applying to any type of filter group of a fluid 1 regardless of the nature of said fluid.

Figure 2:
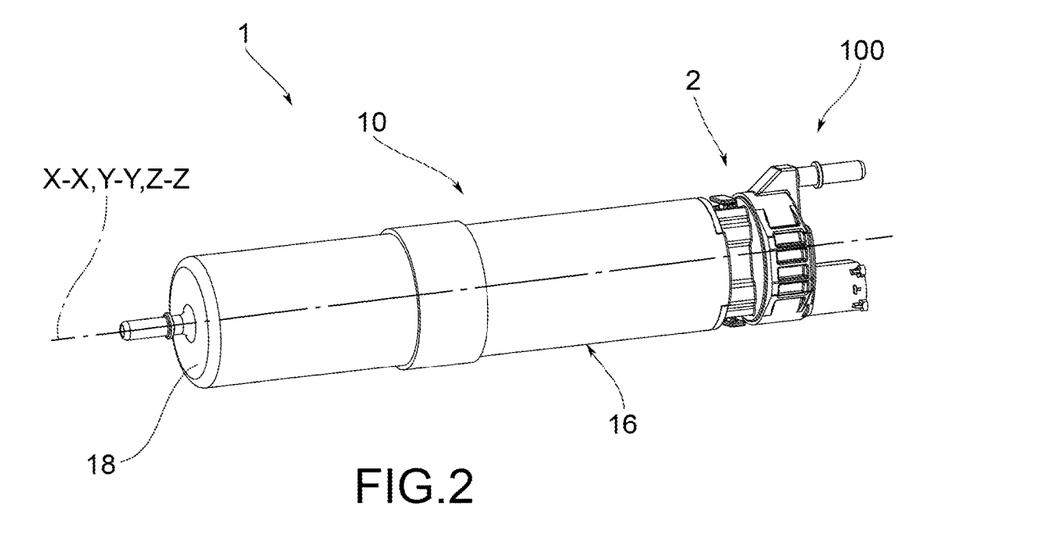
FIGS. 2, 2' and 2" respectively show a perspective view and two side views of a filter group of a fluid according to a first embodiment.
Figure 3A:
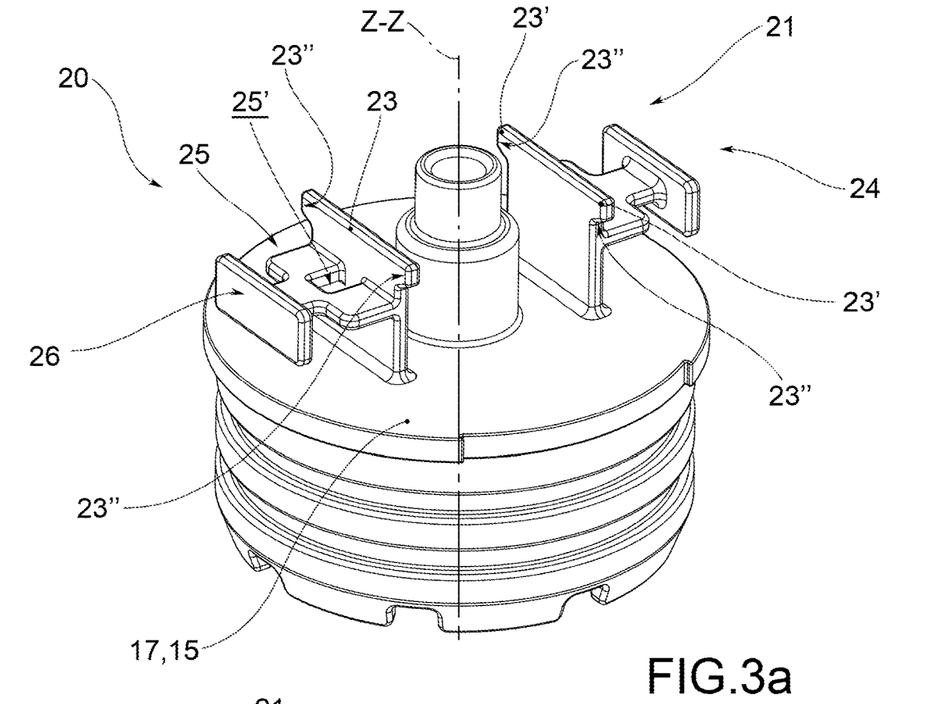
FIGS. 3a and 3b show two perspective views of some of the components of the filter group of a fluid according to FIG. 2, in particular of the means of engagement provided therein.
Figure 3B:
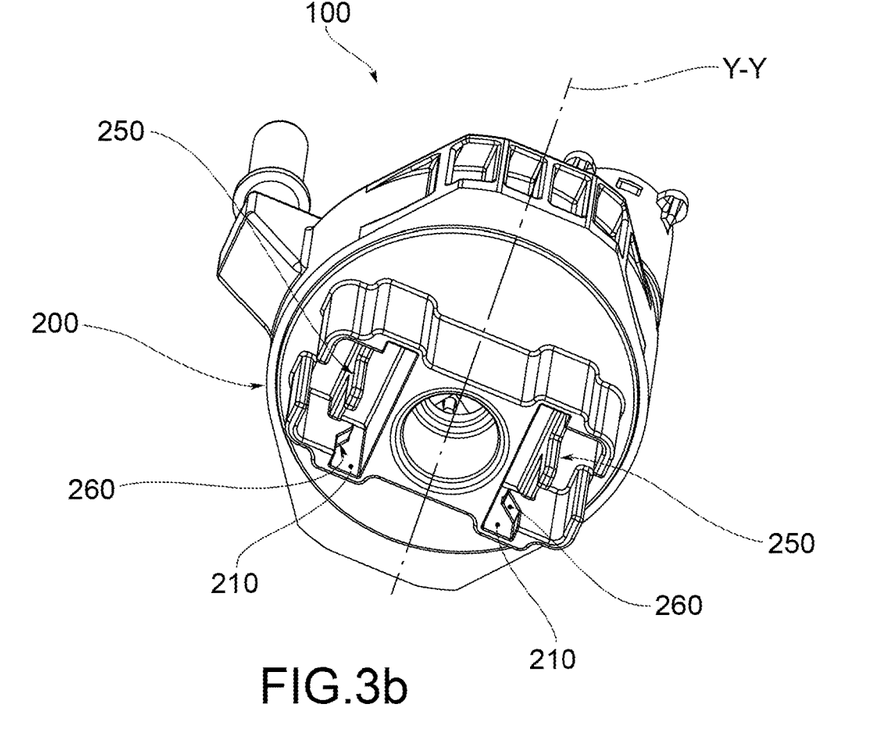
Figure 4:
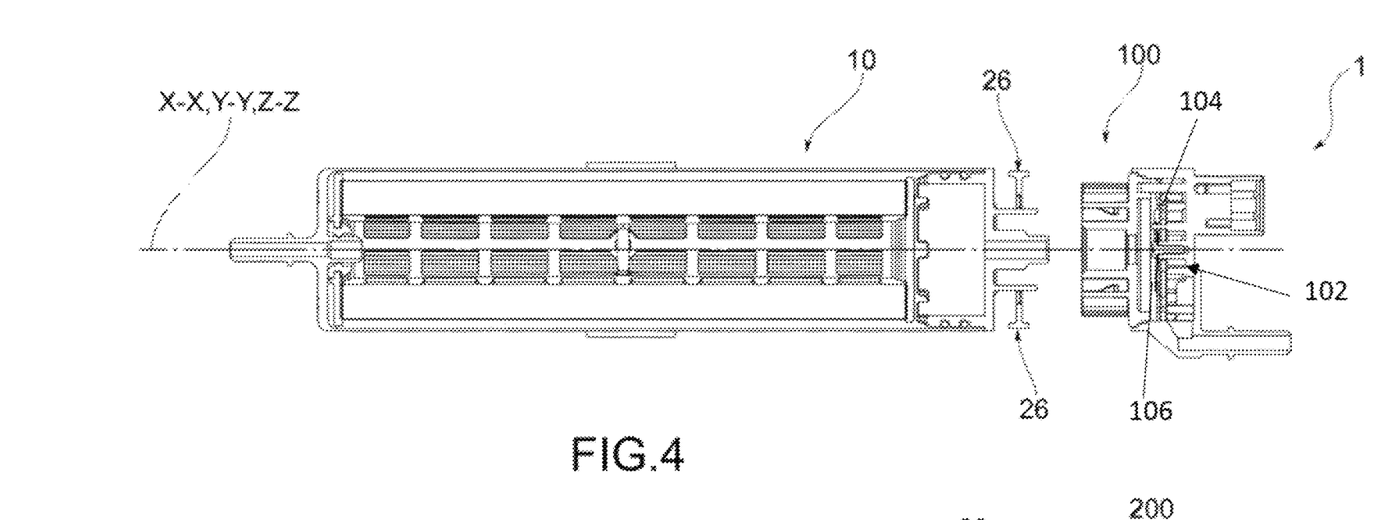
FIGS. 4, 4a and 4b show, in longitudinal cross-section, the assembly phases of the filter group of a fluid as per FIG. 2.
Figure 4A:
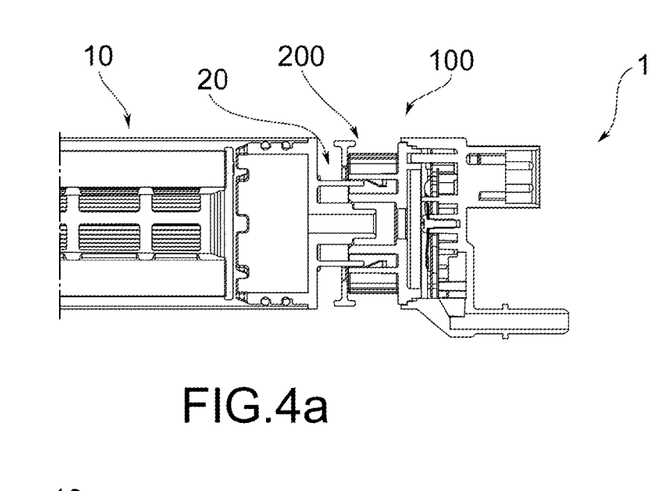
Figure 4B:
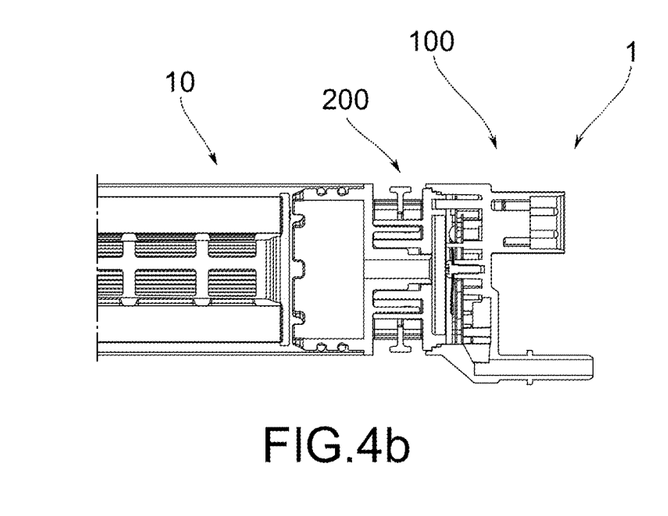

FIGS. 2 to 4, instead, show a preferred embodiment of a filter group of a fluid 1 in which fuel, preferably of the diesel type, is filtered. Preferably, in said embodiments, the base assembly 100 is placed fluidically upstream of the filter cartridge 10.

Figure 5:
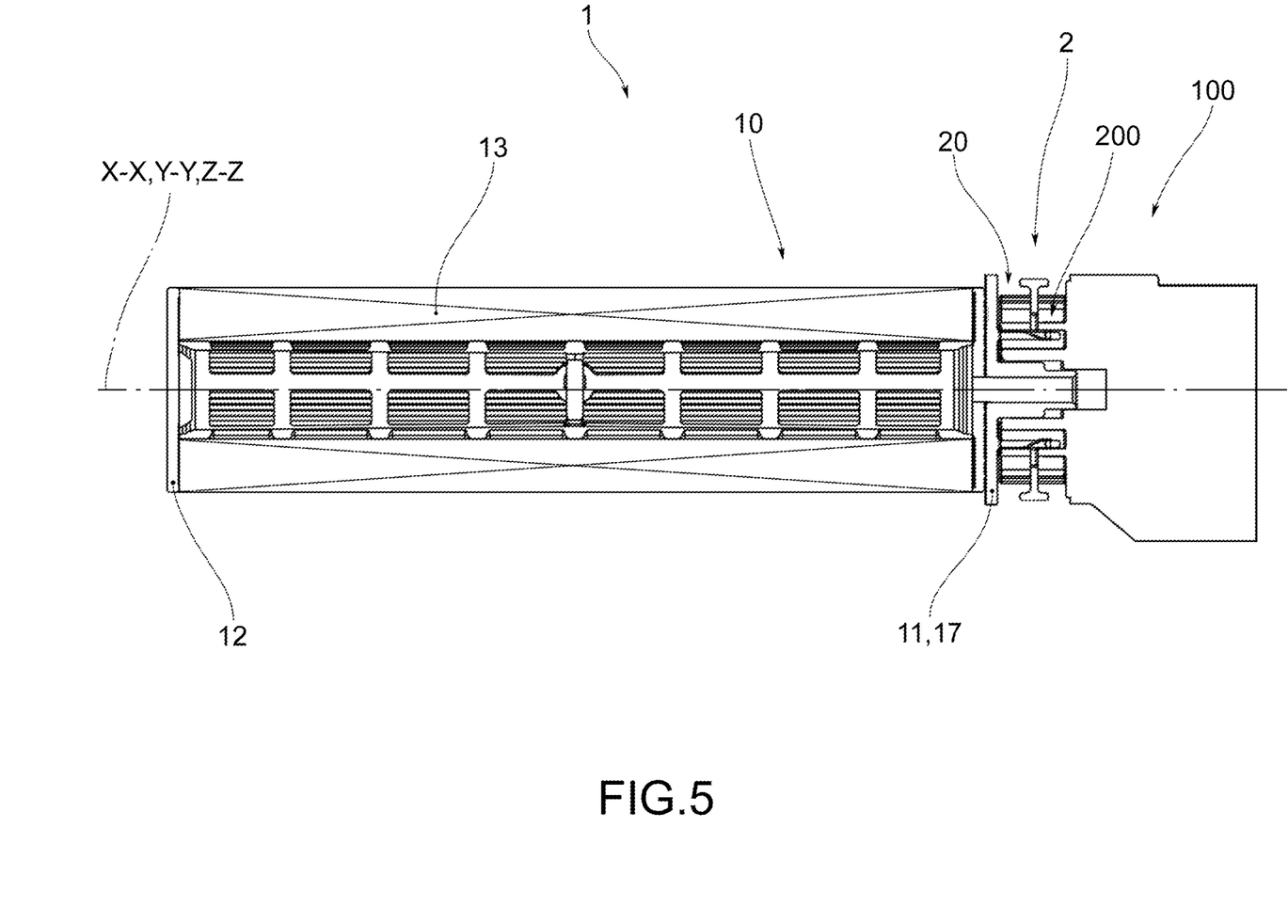
FIG. 5 shows, in cross-section, a filter group of a fluid in an alternative embodiment, comprising the same means of engagement as in the embodiment shown in FIG. 2.

FIG. 5 instead is a schematic diagram of a filter group of a fluid 1 according to an embodiment variant with respect to that of FIGS. 2 and 4, not necessarily limited to the filtration of fuel, not necessarily having the base assembly 100 positioned upstream of the filter cartridge 10.

The embodiment referred to in FIGS. 2 to 4 and the embodiment referred to in FIG. 5 have the same means of engagement 2 described below.

In accordance with the above figures, the reciprocal engagement between the filter cartridge 10 and base assembly 100 takes place in an axial direction along the main axis X-X.

According to some embodiment variants, not shown graphically, the reciprocal engagement between the filter cartridge 10 and base assembly 100 takes place in a rotary direction along the main axis X-X.

According to the present invention, the filter cartridge 10 extends along a cartridge axis Z-Z. Preferably, in the blocking configuration the cartridge axis Z-Z coincides with the main axis X-X.

According to the present invention, in addition, the filter cartridge 10 comprises at an axial end an engagement plane 15 on which said first engagement members 20 are made.

That is to say, the first engagement members 20 extend in height starting from the engagement plane 15.

As shown by way of example in the appended drawings, in a preferred embodiment, the filter cartridge 10 comprises a filter medium 13, preferably of the hollow cylindrical (or tubular) type which is traversable by the fluid radially, extending along the cartridge axis Z-Z.

In an alternative embodiment, the filter medium 13 has an axial extension along the Z-Z axis and is crossed by working fluid in a substantially axial direction, parallel to the Z-Z axis. In particular, the present invention is independent of the direction in which the fluid passes through the filter medium 13.

In addition, the filter cartridge 10 comprises a first filter plate 11 and a second filter plate 12 placed at the axial ends of the filter medium 13, for example welded at its ends.

According to a preferred embodiment, one out of the first filter plate 11 or the second filter plate 12 correspond with the engagement plane 15 presenting on it said first engagement members 20.

According to an embodiment variant, the filter cartridge 10 comprises a cartridge body 16, preferably of a cylindrical (or tubular) shape, having its extension along said cartridge axis Z-Z between a first body plate 17 and a second body plate 18. The filter medium 13 on which the first filter plate 11 and the second filter plate 12 are placed, which is preferably suitable to internally engage the cartridge body 16 to keep the filter medium 13 in a predefined axial position is housed inside said cartridge body 16. Preferably, therefore, said filtration operations are performed inside said cartridge body 16.

According to such embodiment variant, one out of the first body plate 17 or the second body plate 18 correspond with the engagement plane 15 presenting on it said first engagement members 20.

According to the present invention, the first engagement members 20 comprise at least two tooth elements 21 diametrically opposite to the cartridge axis Z-Z. In other words, the tooth elements 21 lie in opposite halves defined by an imaginary plane on which the cartridge axis Z-Z extends. Preferably the tooth elements 21 are reciprocally angularly spaced, preferably, but not necessarily, angularly equidistant. Preferably, the tooth elements are arranged in an asymmetrical manner. Preferably, the tooth elements are arranged in a symmetrical manner. According to the above description, the tooth elements 21 are radially spaced from the cartridge axis Z-Z.

Each tooth element 21 extends in height from the engagement plane 15 extending on an imaginary surface parallel to the cartridge axis Z-Z, having a substantially T shape. In other words, the tooth element 21 lies in its entirety on a single surface extending parallel to the cartridge axis Z-Z. Preferably, said surface is planar (therefore the two distally opposite tooth elements 21 extend on respective imaginary surfaces parallel to each other).

Preferably, said surface is arched, for example circumferential (consequently the two distally opposite tooth elements 21 extend on a respective imaginary surface extending concentrically to the cartridge axis Z-Z).

According to the preferred embodiment, each tooth element 21 comprises a stalk 22 and a head 23. Preferably, stalk 22 and head 23 both lie on said imaginary surface. Preferably, the stalk extends starting from the engagement plane 15, while the head 23 is in a distal position from said plane.

According to the present invention, in the above blocking configuration, the head 23 is engaged in an axial direction by the second engagement members 200.

That is to say, the head 23 comprises coupling portions 23' protruding laterally relative to the stalk 22, in which said coupling portions 23' are engageable by the second engagement members 200 to prevent unwanted movements in an axial direction between the components. In yet other words, the head 23 and the stalk 22 define two undercuts engageable by the second engagement members.

Preferably, said engagement portions 23' extend laterally with respect to the stalk 22. In practice, said engagement portions prove substantially aligned with the profile defined by the main portion of the tooth. Specifically, the engagement portions 23' do not protrude radially from the stalk 22; that is to say, the engagement portions 23' do not protrude from the stalk 22 in a radial direction without forming an angle or nail or a protruding tooth.

According to a preferred embodiment, moreover, said engagement portions 23' project laterally with respect to said stalk 22 in a lateral direction identifying an edge 23" extending in a direction substantially parallel to that of the engagement plane 15 extending in length overlooking said engagement plane 15.

According to a preferred embodiment, moreover, said coupling portions 23' protrude laterally relative to said stalk 22 in a tapered manner in the lateral direction identifying an inclined edge 23" overlooking the engagement plane 15.

In other words, preferably, said coupling portions 23 extend in a lateral direction forming an inclined profile, i.e. the inclined edge 23", with respect to the stalk of the tooth element 21.

In yet other words, said coupling portions 23' extend laterally forming a profile inclined with respect to the main body of the tooth element 21.

According to the present invention, as shown in the figures and described below, the second engagement members 200 have a complementary shape to that of the aforesaid tooth thus providing a T-shaped housing, with respective blocking brackets 230'. Preferably said blocking brackets 230' are inclined just as said inclined edges 23".

According to the present invention, it is to be noted that each tooth element 21 is elastically yielding in a radial direction, so that said blocking configuration is achievable following the radial movement of the tooth element 21.

In other words, to achieve the blocking configuration the tooth element 21 needs to be moved radially to return to its radial starting position once it has reached the position corresponding to the blocking configuration.

According to the present invention, said radial movement of the tooth elements 21 is achieved in the engagement between first engagement members 20 and second engagement members 200 (during the reciprocal axial juxtaposition of the filter cartridge 10 and base assembly 100) or is specifically commanded from the outside, e.g. by the user.

According to a preferred embodiment, said coupling portions 23' are suitable to be engaged by said second engagement members 200 in such a way as to undergo a thrust action in the radial direction during the engagement operations between the filter cartridge 10 and the base assembly 100 (as shown in FIG. 4).

According to a preferred embodiment, in addition the head 23 of the tooth element 21 has an axial split that extends in length for a portion so that the head 23 is divided into two distinct portions (not shown). In such embodiment, for example it is possible that a rib provided on the base assembly 100 is housed in said axial split further strengthening the mutual engagement between components.

According to the present invention in addition, it is to be noted how thanks to an actuation in a radial direction it is possible to block the tooth element 21 and induce it into a position in which it is possible to release the engagement between filter cartridge 10 and base assembly 100.

According to a preferred embodiment, the first engagement members 20 comprise for each tooth element 21 a command device 24, wherein the actuation of the command device 24 involves the radial movement of the tooth element 21.

Preferably, each command device 24 extends radially from the tooth element 21.

According to a preferred embodiment, each command device 24 is positioned in an intermediate portion between the engagement plane 15 and the distal portion of the respective tooth element 21, preferably the head portion 23.

According to a preferred embodiment, each command device 24 comprises a stem 25 which extends substantially perpendicular to the tooth element 21. Preferably, said stem 25 extends planarly orthogonally to the imaginary plane on which the tooth element 21 lies.

According to a preferred embodiment, each command device 24 comprises at the end of the stem opposite the end in which it is connected to the tooth element 21 a command member 26. By means of said command member 26 a radial thrust action is performed on stem 25 and thus on the tooth element 21.

According to a preferred embodiment, the command member 26 has an extension substantially orthogonal to the stem 25 being manually pressed by a user or pressed by specially shaped means. Preferably, the user presses both the diametrically opposite command members 26 by performing a radial action on both tooth elements 21.

According to a preferred embodiment, the command member 26 is substantially a manually pressed button.

According to a preferred embodiment, the stem 25 has a through-opening 25' extending in a direction substantially parallel to the cartridge axis Z-Z.

According to a preferred embodiment, in the blocking configuration, a safety insert 250 included in the second engagement members 200 is suitable to be housed in said through-opening 25'.

According to a preferred embodiment, through opening 25' and safety insert 250 are specially mutually shaped to prevent an excessive radial movement of the tooth element 21. In other words, through opening 25' and safety insert 250 are configured to prevent the tooth element 25 from flexing radially more than a predefined amount, specially designed to avoid breaking the tooth element 21.

As said, the present invention also relates to a base assembly 100 of a filter group of a fluid 1 suitable to engage and fluidically connect said filter cartridge 10 along the main axis X-X.

Specifically, the base assembly 100 comprises said second engagement members 200 suitable to engage the first engagement members 20 described above up to a blocking configuration in which any reciprocal undesired movement is prevented in the axial direction between the components (preferably, such movement is in fact possible only after the actuation of the above-described command devices 24).

Said base assembly 100, at least in the second engagement members 200 extends along an assembly axis Y-Y corresponding to the main axis X-X of the filter group of a fluid 1 in an assembled configuration.

According to the present invention, in fact for each tooth element 21 comprised in the first engagement members 20, the second engagement members 200 comprise a blocking housing 230 in which, in the blocking configuration, the tooth element 21 is housed, being of a complementary shape to it.

In other words, said blocking housing 230 replicates in a complementary manner the shape of the tooth element 21, and in particular the stalk 22 and above all head 23.

In yet other words, the blocking housing 230 replicates the T-shape of the tooth element 21 by presenting blocking brackets 230' specially shaped to abut with the edges 23" of the head 23.

In other words, the blocking housing 230 replicates the T-shape of the tooth element 21 by presenting blocking brackets 230' specially shaped to abut with the inclined edges 23' of the head 23.

According to a preferred embodiment, the second engagement members 200 comprise an insertion guide 210 engageable by the tooth element 21 in such a way that in the engagement operations between the filter cartridge 10 and the base element 100 said insertion guide 210 performs a radial action on the tooth element 21.

Preferably, in fact, in the insertion guide 210 radial thrust teeth 260 are provided suitable to engage the coupling portions 23' to impress a thrust action on the tooth element in the radial direction.

In accordance with these characteristics, in one embodiment, the insertion guide 210 is engaged by the tooth element 21 in the axial direction parallel to the main axis X-X, i.e. parallel to the assembly axis Y-Y along which the base assembly 100 extends.

In accordance with these characteristics, but in a further embodiment, the insertion guide 210 is engaged by the tooth element 21 in a rotational manner.

As shown in the appended drawings, and in particular in the diagrams in FIGS. 1a, 1b, 1c and 1d, in some embodiments, the base assembly 100 is a support group suitable to fluidically connect the filter cartridge 10 to the circuit which said fluid flows in.

Figure 1A:
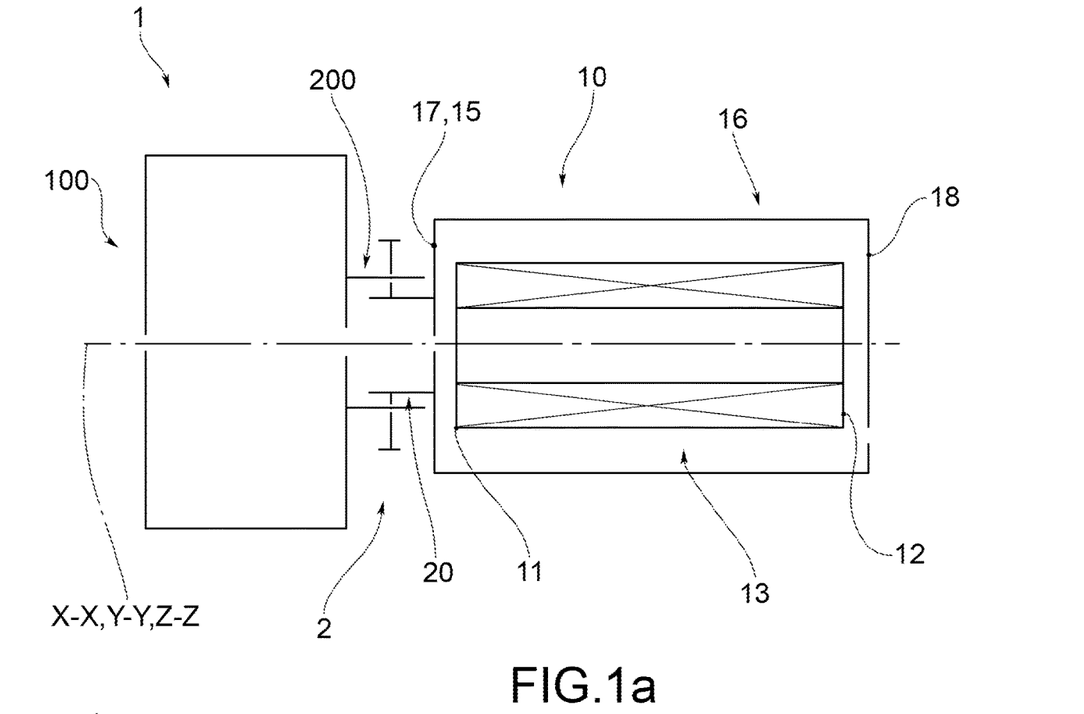
FIGS. 1a, 1b, 1c and 1d show respective schematic representations of a filter group of a fluid according to the present invention, according to respective preferred embodiments thereof.
Figure 1B:
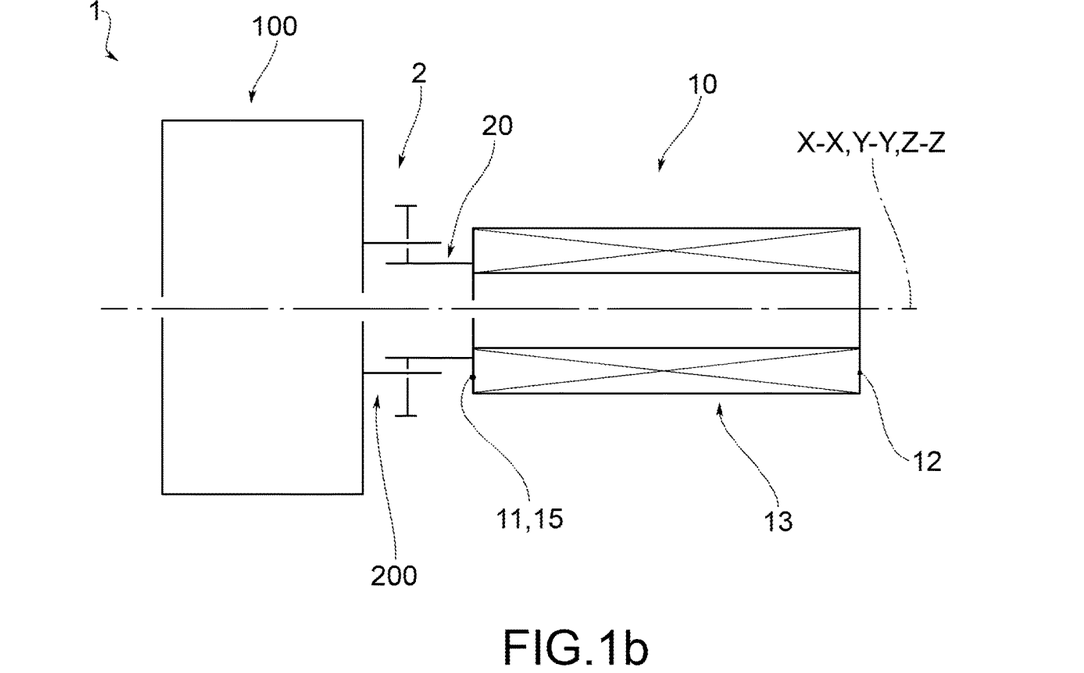
Figure 1C:
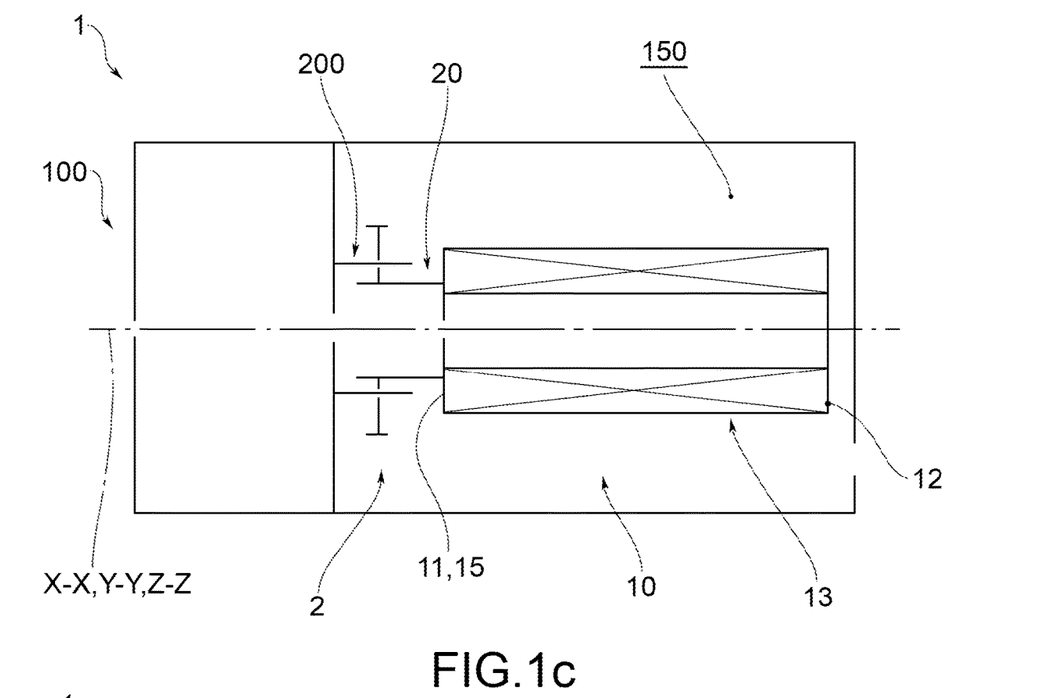
Figure 1D:
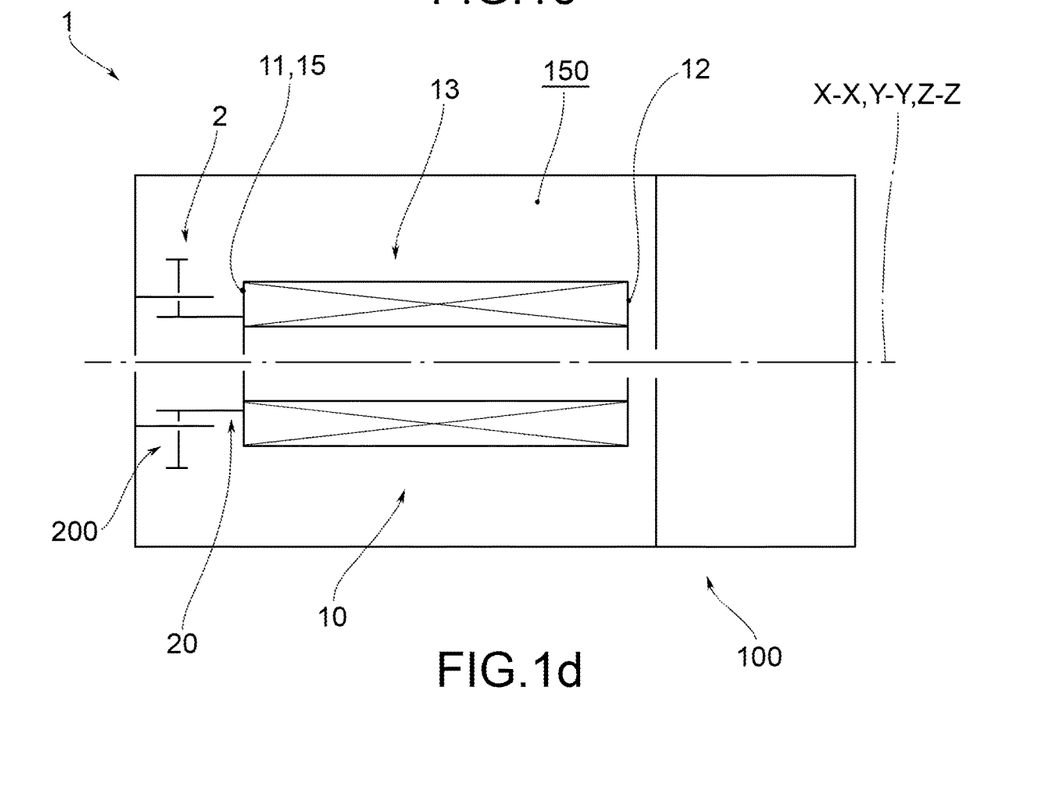

In particular, according to some embodiments, the support group comprises a cartridge housing 150 inside which the filter cartridge 10 is insertable and mountable (as shown schematically in FIGS. 1c and 1d).

According to other embodiments, the support group is engaged directly by the filter cartridge 10 (as shown in FIGS. 1a and 1b).

According to a preferred embodiment, in addition, it is to be emphasised how the base assembly comprises suitable components suitable to perform operations on the respective filtered fluid and/or to be filtered, for example it comprises a heater 102 suitable to heat the fluid to be filtered before this fluidically reaches the filter cartridge 10 or possible command valves. The heater 102 includes heating plates 104 and a positive temperature coefficient (PTC) disc 106 as are known in the art.

The present invention therefore relates to the same filter group of a fluid 1 extending along a main axis X-X and comprises a filter cartridge 10 as described above, a base assembly 100, as described above, and means of engagement 2, as described above.

The present invention relates, in addition, to the method of assembling a filter group of a fluid 1 wherein said method comprises the steps of:
    performing a reciprocal engagement action between the filter cartridge 10 and the base assembly 100 along and/or around the main axis X-X, so as to bring the first engagement members 20 and the second engagement members 200 into the blocking configuration.

Preferably, during the execution phase of the mutual engagement action between the filter cartridge 10 and the base assembly 100 a command action is performed on the tooth elements 21 in a radial direction by the user or by the second engagement members 200.

According to a preferred embodiment, the engagement between filter cartridge 10 and base assembly 100 is achieved by mutual insertion in an axial direction.

According to other embodiment variants, the engagement between filter cartridge 10 and base assembly 100 is achieved by means of insertion in an axial direction and simultaneous or subsequent rotary action.

The present invention also relates to the method of disassembling a filter group of a fluid 1 wherein said method comprises the steps of:
    performing, starting from the blocking configuration, a radial thrust action on the tooth elements 21 comprised in the first engagement members 20;
    performing a reciprocal disengagement action between the filter cartridge 10 and the base assembly 100 along and/or around the main axis X-X.

According to a preferred embodiment, the disengagement between filter cartridge 10 and base assembly 100 is achieved by a reciprocal distancing in the axial direction following actuation of the command devices.

As shown in the tables attached by way of example, the manner in which the cartridge body 16 is constructed is not the object of the present invention. For example, in fact, the cartridge body is composed of a body in aluminium closed at an axial end by a special lid or cap component, for example, in plastic material, wherein the engagement plane 15 is located, and therefore the second engagement members 20 are made on said component.

According to further embodiments, the means of engagement provide for the inverted positioning of the first engagement and the second engagement members described. That is to say, the above described first engagement members are positioned on the base assembly while the second engagement members are positioned on the filter cartridge.

According to some embodiments of the present invention, the filter cartridge and the base assembly are placed in the vehicle in a horizontal position, i.e. extending in a position such as to be parallel to the ground plane on which the vehicle moves.

Innovatively, the filter cartridge, base assembly, filter group of a fluid in a vehicle described above fully satisfies the purpose of the present invention overcoming the drawbacks typical of the prior art. Innovatively, the assembling method and the disassembling method of a filter group fully satisfy the purpose of the present invention overcoming the drawbacks typical of the prior art.

Advantageously, in fact, the assembly and disassembling operations of the filter cartridge-base assembly are extremely simplified, intuitive and guided.

Advantageously, in the blocking configuration the means of engagement guarantee a fixed axial position of the two components maintained over time. Advantageously, the engagement between base assembly and filter cartridge is ensured, and in particular the maintenance of mutual fluidic engagement between the two is guaranteed. Advantageously, in the embodiments in which base assembly or filter cartridge comprise a special housing body of the filter medium, the engagement between base assembly and cartridge is guaranteed even in "emergency (or burst)" situations, in which overpressure or pressure peaks occur inside said housing body.

Advantageously, in some embodiments the movement in a radial direction of the tooth element is guided by the same operations mutual engagement operations between the filter cartridge and base assembly.

Advantageously, the command device is easily commandable in case of need, manually and/or by means of special external command means, specially shaped.

Advantageously, the command device also includes safety means suitable to obviate the risk that the tooth element is excessively subjected to radial actions.

Advantageously, the axial blocking action performed by the edges provided on the lower sides of the lateral portions of the respective teeth is performed in an effective and reliable manner.

Advantageously, the axial blocking action thanks to the inclined edges is effectively unloaded onto the components.

Advantageously, the geometry of the coupling system is simplified, simplifying the sizing of the teeth and their respective seats and advantageously minimising the complexity of the moulds used for the production of the means of engagement and the relative costs. Advantageously the blocking of the tooth is achieved by means of coupling portions which extend laterally from the stalk in a transversal direction (both perpendicular and in a tilted direction) with respect to the flexing direction of said stalk. Advantageously the presence of coupling portions arranged transversally to the flexing direction simplifies the sizing of the coupling surfaces provided on the first engagement members and on the second engagement members to define the coupling force of the tooth.

The positioning of the coupling surfaces in the lateral portions of the tooth elements makes it possible to minimize the onset of momentum responsible for the unwanted release of the tooth.

Advantageously, the assembling method (and conversely the disassembling method) involve simple, intuitive and reproducible operations over time.

A further advantage of the present invention is therefore that it cannot be installed on base assemblies of filter cartridges not equipped with tooth elements such as those described. In other words, in the filter group, it is not possible to use conventional cartridges for example, to ensure, for example during maintenance operations, the quality filter cartridges provided by the manufacturer are used.

Advantageously, the means of engagement provide for the installation of the first engagement members in the base assembly and the second engagement members on the filter cartridge.

It is clear that a person skilled in the art may make modifications to the filter cartridge, base assembly, filter group of a fluid or assembling method so as to satisfy contingent requirements, all contained within the scope of protection as defined by the following claims.

LIST OF REFERENCE NUMBERS 1 filter group of a fluid
10 filter cartridge
100 base assembly
150 cartridge housing
11 first filter plate
12 second filter plate
13 filter medium
15 engagement plane
16 cartridge body
17 first body plate
18 second body plate
2 means of engagement
21 tooth element
22 stalk
23 head
23' lateral portion
23" inclined edge
24 command device
25 stem
25' through opening
26 command member
20 first engagement members
200 second engagement members
210 insertion guide
230 blocking housing
230' blocking brackets
280 rib
260 radial thrust teeth
X-X main axis
Y-Y assembly Axis
Z-Z cartridge axis

The invention claimed is:

1. A filter cartridge of a filter group of a fluid of a vehicle, wherein said filter group extends along a main axis and comprises:
   i) a base assembly for engaging the filter cartridge along the main axis;
   ii) engagement members comprising first engagement members comprised in the filter cartridge and second engagement members comprised in the base assembly, respectively configured to engage each other in a blocking configuration in which the filter cartridge and the base assembly are mutually axially blocked;
   wherein the filter cartridge extends along a cartridge axis and comprises, at an axial end, an engagement plane on which said first engagement members are made, comprising at least two tooth elements diametrically opposite the cartridge axis;
   wherein each tooth element extends in height from the engagement plane extending on an imaginary surface parallel to the cartridge axis, having a substantially T shape, comprising a stalk and a head, wherein the head of each tooth element comprises two coupling portions protruding laterally from said stalk, and wherein in the blocking configuration said two coupling portions are engaged in the axial direction by the second engagement members;
   wherein each tooth element is elastically yielding in a radial direction, so that the tooth element is in said blocking configuration following the radial movement of the tooth element.

2. The filter cartridge according to claim 1, wherein each coupling portion protrudes from the stalk in a tapered manner in the lateral direction forming an inclined edge overlooking the engagement plane.

3. The filter cartridge according to claim 1, wherein said coupling portions are engaged by said second engagement members to undergo a thrust action in the radial direction during engagement operations between the filter cartridge and the base assembly.

4. The filter cartridge according to claim 1, wherein the first engagement members comprise for each tooth element a command device, wherein each command device extends radially from the tooth element, wherein actuation of the command device comprises radial movement of the tooth element.

5. The filter cartridge according to claim 4, wherein each command device comprises a stem which extends substantially perpendicular to the tooth element.

6. The filter cartridge according to claim 5, wherein each command device comprises at an end of the stem opposite an end which is connected to the tooth element, a command member, by which a radial thrust action is executable on the stem and on the tooth element.

7. The filter cartridge according to claim 6, wherein the command member has an extension substantially orthogonal to the stem for being pressed by a user or by a shaped device.

8. The filter cartridge according to claim 5, wherein said stem has a through-opening extending in a direction substantially parallel to the cartridge axis wherein, in the blocking configuration, a safety insert comprised in the second engagement members is housed in said through opening.

9. The filter cartridge according to claim 4, wherein the command device is positioned at an intermediate distance between the engagement plane and the head of the tooth element.

10. The filter cartridge according to claim 1, comprising:
   a hollow cylindrical filter medium, which is traversable by the fluid radially, extending along the cartridge axis;
   a first filter plate and a second filter plate placed at axial ends of the filter medium;
   wherein the first filter plate or the second filter plate correspond with the engagement plane, presenting on the engagement plane said first engagement members.

11. The filter cartridge according to claim 1, comprising:
a cartridge body extending along said cartridge axis between a first body plate and a second body plate;
a filter medium housed in the cartridge body;
wherein the first body plate or the second body plate correspond with the engagement plane presenting on the engagement plane said first engagement members.

12. A base assembly of the filter group of a fluid of a vehicle according to claim 1, wherein said filter group extends along the main axis and comprises:
i) the filter cartridge, wherein the base assembly is configured to engage said filter cartridge along the main axis;
ii) said first engagement members comprised in the filter cartridge and second engagement members which comprise for each tooth element comprised in the first engagement members a blocking housing in which, in the blocking configuration, the tooth element is housed, the blocking housing having a shape complementary to the tooth element.

13. The base assembly according to claim 12, wherein the second engagement members comprise an insertion guide engageable by the tooth element configured so that in engagement operations between the filter cartridge and the base assembly said insertion guide performs a radial action on the tooth element.

14. The base assembly according to claim 13, wherein said insertion guide is engaged by the tooth element in an axial direction parallel to the main axis or wherein said insertion guide is engaged in a rotational manner by the tooth element.

15. The base assembly according to claim 12, wherein said base assembly is a support group to fluidically connect the filter cartridge to a circuit in which said fluid flows.

16. The base assembly according to claim 15, wherein said support group comprises a cartridge housing inside which the filter cartridge is insertable and mountable.

17. The base assembly according to claim 15, wherein the support group comprises a heater to heat the fluid to be filtered before the fluid fluidically reaches the filter cartridge.

18. The base assembly according to claim 12, wherein said blocking housing comprises a T-shape complementary to the tooth element, the blocking housing including blocking brackets configured to abut edges of the head of the tooth element.

19. The filter cartridge according to claim 1, wherein the base assembly fluidically connects the filter cartridge.

20. A filter group of a fluid of a vehicle, wherein said filter group extends along a main axis and comprises:
a filter cartridge;
a base assembly configured to engage said filter cartridge along the main axis;
engagement members comprising first engagement members comprised in the filter cartridge and second engagement members comprised in the base assembly, respectively shaped to engage each other in a blocking configuration in which the filter cartridge and the base assembly are mutually axially blocked;
wherein the filter cartridge extends along a cartridge axis and comprises, at an axial end, an engagement plane on which said first engagement members are made, comprising at least two tooth elements diametrically opposite the cartridge axis;
wherein each tooth element extends in height from the engagement plane extending on an imaginary surface parallel to the cartridge axis, having a substantially T shape, comprising a stalk and a head, wherein the head of each tooth element comprises two coupling portions protruding laterally from said stalk, and wherein in the blocking configuration said head is engaged in the axial direction by the second engagement members;
wherein each tooth element is elastically yielding in a radial direction, so that the tooth element is in said blocking configuration following radial movement of the tooth element.

21. A method of assembling the filter group of a fluid of a vehicle, according to claim 20, comprising the steps of:
performing a reciprocal engagement action between the filter cartridge and the base assembly along or around the main axis to bring the first engagement members and the second engagement members into the blocking configuration.

22. An assembling method of the filter group of a fluid according to claim 21, wherein during an execution phase of mutual engagement action between the filter cartridge and the base assembly a command action is performed on the tooth elements in a radial direction by the user or by the second engagement members.

23. A method of disassembling the filter group of a fluid of a vehicle, according to claim 20, comprising the steps of:
performing, starting from a blocking configuration, a radial thrust action on the tooth elements comprised in the first engagement members;
performing a reciprocal disengagement action between the filter cartridge and the base assembly along or around the main axis.

24. The filter group according to claim 20, wherein for each tooth element of said second engagement members, the filter group comprises a blocking housing having a T-shape complementary to the tooth element, the blocking housing including blocking brackets configured to abut edges of the head of the tooth element.

* * * * *